(12) United States Patent
Smith

(10) Patent No.: US 6,226,658 B1
(45) Date of Patent: May 1, 2001

(54) LAYOUT CODE TUNING IN UNIVERSALLY READABLE DOCUMENT FILES

(75) Inventor: Raymond W. Smith, Fort Collins, CO (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/100,368

(22) Filed: Jun. 19, 1998

(51) Int. Cl.$^7$ ........................................ G06F 7/00
(52) U.S. Cl. ..................... 707/517; 707/523; 707/522; 707/520
(58) Field of Search .................... 707/523, 522, 707/517, 513, 515, 530, 531, 520

(56) References Cited

U.S. PATENT DOCUMENTS

| | | | |
|---|---|---|---|
| 4,751,740 | * | 6/1988 | Wright ................................... 382/180 |
| 4,945,504 | * | 7/1990 | Nakama et al. ...................... 708/141 |
| 5,276,527 | * | 1/1994 | Sugiyama et al. ................... 358/296 |
| 5,276,792 | * | 1/1994 | Masaki ................................. 707/521 |
| 5,283,887 | * | 2/1994 | Zachery ............................... 707/513 |
| 5,379,340 | * | 1/1995 | Overend et al. ................... 379/93.24 |
| 5,513,323 | * | 4/1996 | Williams et al. ..................... 709/246 |
| 5,608,874 | * | 3/1997 | Ogawa et al. ....................... 709/246 |
| 5,652,876 | * | 7/1997 | Ashe et al. ....................... 395/500.47 |
| 5,712,907 | * | 1/1998 | Wegner et al. ...................... 379/112 |
| 5,740,405 | * | 4/1998 | DeGraaf .......................... 395/500.43 |
| 5,745,910 | * | 4/1998 | Piersol et al. ........................ 707/515 |
| 5,761,347 | * | 6/1998 | Chan et al. .......................... 382/270 |
| 5,761,684 | * | 6/1998 | Gibson ................................. 707/515 |
| 5,812,862 | * | 9/1998 | Smith et al. ......................... 707/515 |
| 5,835,919 | * | 11/1999 | Stern et al. ......................... 707/515 |
| 5,909,568 | * | 6/1999 | Nason ............................. 395/500.34 |
| 5,918,238 | * | 6/1999 | Hayashi .............................. 707/526 |
| 5,920,733 | * | 7/1999 | Rao ....................................... 710/68 |
| 5,960,444 | * | 9/1999 | Jackson ............................... 707/203 |
| 5,987,257 | * | 11/1999 | Whitten ............................... 395/709 |
| 5,990,899 | * | 11/1999 | Whitten ............................... 345/427 |
| 6,006,242 | * | 12/1999 | Poole et al. .......................... 707/531 |

OTHER PUBLICATIONS

"Validation of Direct Manipulation Dat Operations in OS/2 2.0", IBM Tech. Disc. Bulletin, 423–424, Jan. 1994.*
Microsoft Word 97 Screendumps, pp. 1–4, 1997.*
SE Using Lotus Notes, Cate Richards, QUE, Chapter 12, pp. 1–6, Sep. 1, 1995.*
WP meets DTP, Jackson, Oct. 24, 1990, PC User, n144, p84(4).*
Sharing data between Web page frames using JavaScript, Tessier, May 1996, Dr. Dobb's Journal, v21, n5, p72(5).*
Compound documents: what could be better than ASCII?, Williams, Mar. 1993, Dr. Dobb's Journal, v18, n3, p32(5).*
Word processor translation software: preserving the formatted page, Krasnoff et al, Jun. 23, 1987, PC magazine, v6, n12, p169(8).*
Still searching for a universal file format, Rosenthal et al, Jan. 13, 1992, MacWEEK, v6, n2, p74(2).*

* cited by examiner

*Primary Examiner*—Stephen S. Hong
*Assistant Examiner*—Cesar B. Paula

(57) ABSTRACT

Page layout code in so-called "universal" document file formats (such as RTF) is customized to make the file format more universally compatible with word processor applications software across a spectrum of different manufacturers. The invention groups word processor applications into a "target list", and then customizes the page layout code so that document files distributed in the customized file format will be as universally receivable as possible within the word processor applications on the target list. A preferred embodiment of the invention customizes RTF code using "framing" techniques. For example, an empty paragraph of plain flowing text is inserted at the start of the document to enhance the compatibility with Microsoft Word. An empty frame is inserted at the start of the document to enhance compatibility with Corel WordPerfect. Other tuning is disclosed representing enhancements of compatibility with other commercial word processing packages.

14 Claims, 2 Drawing Sheets

FIG. 2A

201 \\paperw15840\paperh12240
202 \\margl360\margt360\margr360\margb360
203 \\widowctrl\ftnbj\landscpsxn\ftnrstpg\ftnstart1\pgnstart1\deftab720
204 \\viewkind1\linemod0\linex0
205 \\sectd\sbknone{\pard\plain\f0\fs12\par}
206 \\pard\absw1440\absh-120\phpg\posx360\pvpg\posy540
207 \\nowrap\ql\fi0\li0\sb0\sl-120{\plain\f0\fs12\f1\par}

FIG. 2B

211 \\pard\plain\f0\pvpg\phpg\posx936\posy720\absw0\absh0\nowrap
212 {{\pict\wmetafile8\picw7213\pich3826\picwgoal4089\pichgoal2169
213 <Hex Data>
214 }}\par

FIG. 2C

221 \\pard\pvpg\phpg\posx5956\posy4833\absw3384\absh2112
222 \\dfrmtxtx0\dfrmtxty0\nowrap\ql\fi0\li0\ri0\sb0\sl-364
223 {\plain\f0\fs16\f1<TEXT>\par}

FIG. 2D

231 \\sect\\sectd\\sbkpage
232 {\pard\plain\f0\fs12\par}
233 \\pard\absw1440\absh-120\phph\posx360\pvpg\posy540
234 \\nowrap\ql\fi0\li0\sb0\sl-120{\plain\f0\fs12\f1\par}

LAYOUT CODE TUNING IN UNIVERSALLY READABLE DOCUMENT FILES

TECHNICAL FIELD OF THE INVENTION

This invention relates to universally-readable computer document files, and more specifically to a system and method of tuning the page layout codes in such document files so as to improve universal compatibility with multiple different manufacturers' word processing, desktop publishing and related applications.

BACKGROUND OF THE INVENTION

It is well understood in the art of computer document publishing that different software manufacturers adopt different formatting standards in compiling document files. This presents a problem in generating document files that are compatible with multiple word processing packages. Software manufacturers have addressed this problem in recent years by releasing new versions of their word processor applications that can (a) receive files in a foreign format and convert them into the native format for that application, and (b) save completed work in a file format acceptable and readable by one or more specific foreign applications. Not all software manufacturers offer receipt and saving capability for documents in all foreign formats, however, and of course, not all conversions are done the same way by different manufacturers. Thus, cross-application compatibility is far from universal and predictable.

A further problem presents itself in the art when a physical document is being scanned into a word processor-readable computer file by a scanner. Optical character reading ("OCR") software may prepare the scanned-in software for a subsequent word processing, but the user may not know ahead of time which format to select in instructing the OCR software to prepare a document file. Alternatively, the user may prefer not to select a word processor-specific format ahead of time at all, if she expects the file to be destined to be received by many word processor types.

The typical solution is for the user to instruct the OCR software to save the document in one of the "universally-read" file types known in the art, such as Microsoft's Rich Text Format (RTF). As will be discussed, however, use of quotes in describing these file types as "universally-read" is appropriate in view of the fact that there are still problems accepting these files universally among different word processors.

Another alternative for the user is to save the applications document in Adobe's "pdf" format (standing for "portable document format"). The drawbacks with this alternative, however, are that (a) a special viewer, albeit freely obtainable, is required to read and view the document, and (b) the document may not be edited once it is read and displayed by the viewer. Thus, "pdf" documents are useful primarily for electronic distribution of documents in a read-only format, where the target audience is likely to have or be able to easily obtain, the correct viewing software.

Returning, then, to the problem of generating document files that may universally received by various manufacturers' word processing applications, the option perhaps most often chosen by users is to save the document in Microsoft's RTF. RTF is typical of "universally-readable" document file formats in that it was designed to address the compatibility problems described above. As noted, however, RTF is also typical of its genre in that it still is not as "universal" as a user might hope for. Experience has shown, for example, that in some popular word processing applications, a perfectly legal RTF file will show as a blank. In others, the original page layout will become lost or disfigured. Some legal RTF files have even been known to cause word processor applications to crash.

Clearly, RTF files read as blank, or causing the word processor to crash, are unacceptable. Disfigured page layouts from the original could in theory be tolerated, but of course this means that the layouts then have to be cleaned up and restored when received in the destination word processor application. This is an unnecessary chore, and may be difficult to do if the originally-created page layouts are not known. Further, it defeats the purpose of setting up an originally-organized page layout if this layout is lost or disfigured by a word processor's document file opening protocols operating on a supposedly "universal" document file format.

There is therefore a need in the art to perfect the "universal" compatibility of document file formats such as RTF so as to make them more truly universally compatible with popular word processor applications. This will then enable publishers to create document files, either by scanning or by original creation, in a format that will be seamlessly accepted for further editing by many other word processors without the document creator having to know in advance which word processor type is likely to be used.

SUMMARY OF THE INVENTION

These and other objects, features and technical advantages are achieved by a system and method in which page layout code in so-called "universal" document file formats (such as RTF) is customized to make the file format more universally compatible with word processor applications software across a spectrum of different manufacturers. Since different manufacturers treat document file types in different ways, it is not possible to generate a single "fix". The invention therefore groups word processor applications into a "target list". The invention then customizes the page layout code so that document files distributed in the customized file format will be as universally receivable as possible within the word processor applications on the target list. While the invention requires no specific criteria for being included on the target list, it may be advantageous to select word processor application for inclusion on the list according to predetermined criteria, such as their general commercial popularity, or their popularity within a specific industry segment or commercial/scientific community.

A preferred embodiment of the invention customizes RTF code using "framing" techniques according to a target list of general user popularity among commercially-available word processor software packages. The list includes all the major packages such as Microsoft Word, Corel WordPerfect, Lotus WordPro, Microsoft Works, Aldus Pagemaker, and Microsoft WordPad. The list in the preferred embodiment also includes most of the recent versions of these word processor packages. It will be appreciated, however, that the invention is not limited to any particular series of word processor packages or versions thereof. It will be further appreciated that the invention is also not limited to customizing RTF code using framing techniques. It will be realized that the invention is broader in concept in that it "tunes" the so-called "universal" code. More specifically, the invention customizes page layout code in document file formats originally intended to be compatible across a spectrum of target word processor applications, so that the customized code enhances the chances that the document file, when read by one of the target applications, reflects the page layout of the document substantially as originally created.

It is therefore a technical advantage of the present invention to enable those in the document publishing community to generate document files in formats such as RTF, originally understood to be compatible with a spectrum of differing word processor software applications, with greater confidence that the document files will indeed be substantially universally compatible, without fear of possible loss of page layout or other detrimental consequences.

It is a further advantage of the present invention to be able to select universal file types in which to save documents where customizations to said file types are tailored to a specific predetermined target list of word processor applications.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A and 2D depict exemplary RTF document header code enabling tuning according to a preferred embodiment of the inventor;

FIG. 2B depicts exemplary RTF picture frame code illustrating tuning according to a preferred embodiment of the invention; and FIG. 2C depicts exemplary RTF text frame code illustrating tuning according to a preferred embodiment of the invention.

DETAILED DESCRIPTION OF THE INVENTION

Figure 1:
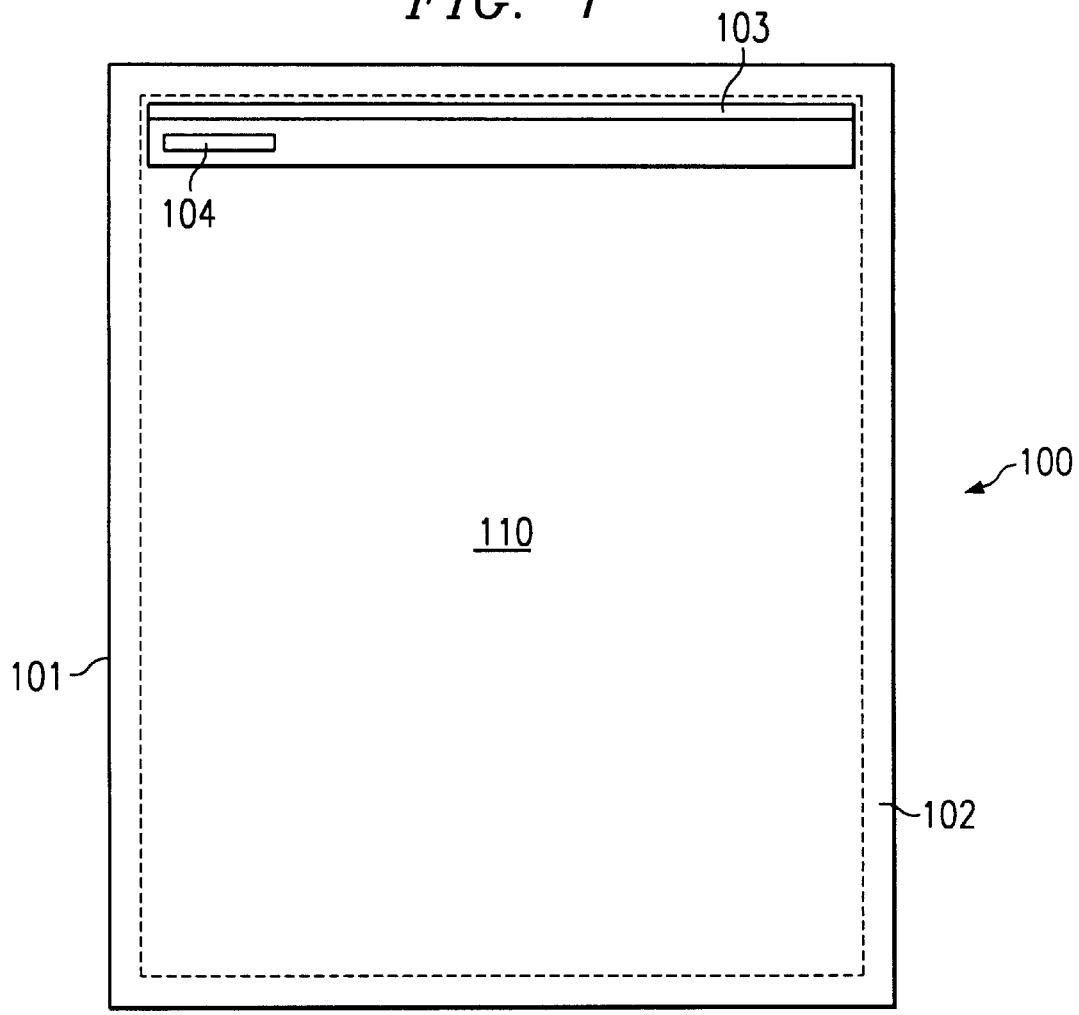
FIG. 1 depicts selected tuning of the page layout of an RTF document to improve compatibility with word processors.

As has already been noted, a preferred embodiment of the invention will be described with reference to using framing techniques to tune the page layout of an RTF document file so as to enhance compatibility with a predetermined target list of commercial word processor packages selected according to general commercial popularity. This exemplary target list is:

Microsoft Word (all versions)
Corel WordPerfect (version 6.0 and up)
Microsoft Works (all versions)
Aldus Pagemaker (all versions)
Lotus WordPro (all versions)
Microsoft WordPad (all versions)

It will nonetheless be appreciated that the invention is broader in concept, and is not limited to use of framing techniques to tune the page layout of an RTF document. The invention as claimed is enabled by any tuning of the page layout code of a document file in a format originally intended to be compatible across a spectrum of target word processor applications, where that tuning enhances the chances that the document file, when read by one of the target applications, reflects the page layout of the document substantially as originally created.

FIG. 1 is a representation of the page layout of a document created in RTF according to a preferred embodiment of the invention. Page 100 is bounded and defined by page boundary 101. To enhance universal compatibility (most notably with WordPerfect), the paper size enclosed within page boundary 101 should advantageously be set for the default for the native country wherever possible.

Margin 102 all round on page 100 needs to be set to lie within the printable area of most printers. Advantageously, margin 102 will be selected to be as narrow all round as possible, as defined or limited by printable areas seen by printers. Setting margin 102 as narrow all round as possible maximizes workspace 110 in which text or frames may be placed in RTF. This in turn maximizes the chance that there will be sufficient page room in target word processor applications for information to fit on the page without causing the target application to disfigure the original layout of the document.

With further reference to FIG. 1, empty plain flowing text paragraph 103 enhances compatibility with Microsoft Word. Specifically, it has been observed that an RTF file containing only frames (and no flowing text), when read by Microsoft Word, causes selected page layout editing functions to be mysteriously blocked out in the Word application. The inclusion of empty plain flowing text paragraph 103 at the top of the RTF document prevents the Microsoft Word software from doing this. To minimize the effect of empty plain flowing text paragraph 103 to reduce workspace 110, a small size, such as 6 point, is advantageously selected.

Empty frame 104 on FIG. 1 enhances compatibility with WordPerfect applications, notably versions 6 and up. Specifically, it has been observed that this application has a tendency to ignore the first frame of an RTF document. In the presence of empty frame 104, however, the application reads and displays subsequent frames correctly. In order to minimize the effect of empty frame 104 to reduce workspace 110 on FIG. 1, the frame size of empty frame 104 should be selected to be as small as possible. In a preferred embodiment, empty frame 104 is 1" horizontally by ¹⁄₁₂" vertically in size, and placed with the top edge ⅛" down from the top margin.

It will be appreciated that in tuning the page layout as described with reference to FIG. 1, certain "artificial" adjustments have been made in positioning the document on page 100. It is often useful to compensate for these adjustments and by making corresponding "artificial" adjustments in selecting the page size of the RTF document. For example, the page can be selected to be ¼" larger all round to compensate for margin 102 on FIG. 1, and longer still to compensate for empty plain flowing text paragraph 103 and/or empty frame 104. Then, when the document is retrieved into the target word processor application, common functions in the target application such as scaling, resizing or clipping will allow the user to bring the document into a standard page size.

FIG. 2A depicts exemplary RTF code, advantageously placed between the header and the page data, which will enable the tuning described above with reference to FIG. 1. Line 201 on FIG. 2A selects the paper size. In the exemplary embodiment described, the paper size selected on line 201 is 11" wide×8½" long, (i.e. a landscape orientation of standard U.S. letter size). For optimal performance, the paper size should always be selected in the RTF file to be the standard default size for the local country. This minimizes the chance of incompatibility with word processor applications that cannot accept non-standard or foreign paper size. This also minimizes the chance of the user's printer being unable to print the document as a result of having the wrong paper size loaded.

Line 202 on FIG. 2A enables margin 102 on FIG. 1. Line 203 contains standard commands including an orientation setting for landscape. If portrait orientation is required instead, the "\landscpsxn" in line 203 should be omitted and the paper size definitions in line 201 should be reversed. Line 204 directs target word processor applications to go to page layout mode. Line 205 on FIG. 2A enables empty plain flowing text paragraph 103 on FIG. 1, while lines 206 and 207 on FIG. 2A enable empty frame 104 on FIG. 1.

Referring momentarily to FIG. 2D, if multiple pages need to be stored in a single file, the code depicted on FIG. 2D can be used to generate a page break, and then set up subsequent pages with empty plain flowing text paragraph 103 and empty frame 104. The frames for the next page then follow this code.

It will be appreciated that once tuning code such as exemplified on FIG. 2A and/or 2D has been appended to the header of the document, code for the body of the document can be set out. In a preferred embodiment, the body of the document is comprised of a sequence of frames, both text and picture frames. To enhance universal retrieval by as many different word processor applications as possible, the frames are advantageously ordered by logical reading order, although this sequence may be modified where necessary to ensure that overlapping objects are laid down in the best possible order for reproduction quality.

FIG. 2B depicts RTF code enabling an exemplary picture frame. In FIG. 2B, a number of tuning operations have been made to the RTF code to improve the universality of the RTF document in accordance with the present invention. A first illustrated tuning operation is the inclusion of double braces in lines 212 and 214. Without the double braces, some applications (most notably WordPad 1.0) have been observed to ignore all but the first picture frame in a standard RTF document. Universality is restored by adding the double braces.

With further reference to FIG. 2B, it will be appreciated that in RTF code, all picture frames (whether bitmap or vector data) should advantageously be stored as metafiles for universality, such as is called out on line 212. A metafile is also advantageously expressed in hex (as illustrated in line 213) to make the file as universally readable as possible. Further, according to the invention, the width and height of the picture ("picw" and "pich" values) should be expressed in the same coordinate space units as specified in the metafile itself, rather than the customary TWIPS units required by RTF for "picwgoal" and "pichgoal" values. Some applications, such as Microsoft Word 97, have demonstrated a tendency to ignore one or other of the "picw"/ "pich" or "picwgoal"/"pichgoal" sets, preventing the picture from being sized correctly when the two sets are not expressed in the required coordinate space units.

Further inventive tuning can be observed on FIG. 2B by noting that to ensure universal compatibility, the "\posx," "\posy," "\absw" and "\absh" commands should remain in that sequence. This tuning operation will ensure that Lotus WordPro 97 reads the RTF correctly. Also, the following inventive tuning operations are illustrated on FIG. 2B:

(a) the "\absw" and "\absh" values are set to zero to make the picture scale automatically when the frame is resized;

(b) the "\pard\plain\f0" sequence ensures that the frame will expand to fit the picture; and (c) if the picture size is less than 10 points, the "\fs" command should be inserted to ensure that the frame will shrink to fit the picture.

These tuning operations are not word processor specific, but rather enhance the compatibility of the document with all word processors in the target group.

FIG. 2C depicts RTF code for an exemplary text frame. Note again that the sequence of "\posx," "\posy," "\absw" and "\absh" values should be preserved to enhance compatibility with Lotus WordPro.

It will be further appreciated with reference to FIG. 2C that multiple paragraphs of text can be placed in the same text frame by repeating the illustrated code for each paragraph.

Although the present invention and its advantages have been described in detail, it should be understood that various changes, substitutions and alterations can be made herein without departing from the spirit and scope of the invention as defined by the appended claims.

I claim:

1. A method of tuning layout code in an universally readable document file, comprising:

(a) creating a document file in a universal format with layout code generating an original document layout;

(b) compiling a target list of word processor applications into each of which the document file is to be retrieved in a corresponding target document layout, the target document layout for each word processor application on the list desired to be substantially identical to the original document layout; and (c) making selected customizations to the layout code in the document file, each of said customizations making the target document layout for at least one word processor application on the list more closely identical to the original document layout;

the customizations selected from the group consisting of:
(1) setting paper size to default for the native country;
(2) setting margins all round as narrow as is allowed by printable area;
(3) inserting a leading empty plain flowing text paragraph;
(4) inserting a leading empty frame; and
(5) sequencing document frames in logical reading order.

2. A method of tuning layout code in an universally readable document file, comprising:

(a) creating a document file in a universal format with layout code generating an original document layout;

(b) compiling a target list of word processor applications into each of which the document file is to be retrieved in a corresponding target document layout, at least one word processor application on the list selected from the group consisting of:
(1) Microsoft Word;
(2) Corel WordPerfect;
(3) Lotus WordPro;
(4) Aldus Pagemaker;
(5) Microsoft Works; and
(6) Microsoft WordPad;

the target document layout for each word processor application on the list desired to be substantially identical to the original document layout; and (c) making selected customizations to the layout code in the document file, each of said customizations making the target document layout for at least one word processor application on the list more closely identical to the original document layout;

the customizations selected from the group consisting of:
(1) setting paper size to default for the native country;
(2) setting margins all round as narrow as is allowed by printable area;
(3) inserting a leading empty plain flowing text paragraph;
(4) inserting a leading empty frame; and
(5) sequencing document frames in logical reading order.

3. The method of claim 1, in which step (b) includes the substep of organizing the word processor applications on the list into a descending order of priority for target document layouts to be substantially identical to the original document layout, and in which said customizations in step (c) are made according to said priority.

4. The method of claim 3, in which said priority is selected according to commercial popularity of the word processor applications on the list.

5. The method of claim 1, in which the universal format is Rich Text Format (RTF).

6. The method of claim 1, in which at least one word processor application on the list is selected from the group consisting of:
(1) Microsoft Word;
(2) Corel WordPerfect;
(3) Lotus WordPro;
(4) Aldus Pagemaker;
(5) Microsoft Works; and
(6) Microsoft WordPad.

7. The method of claim 1, in which the universal format is Rich Text Format (RTF), and in which at least one of the customizations made in step (c) is selected from the group consisting of:
(1) surrounding frame commands with double braces;
(2) expressing pich and picw values in the same coordinate space units as specified in the metafile to which said pich and picw values refer;
(3) maintaining \posx, \posy, \absw and \absh frame code commands in sequence;
(4) initializing \absw and \absh values in frame code to zero;
(5) enabling frame expansion with a \pard\plain\f0 command sequence; and
(6) when a picture size is less than 10 points, enabling frame shrinking with a \fs command.

8. A method of tuning layout code in a universally readable document file, comprising
(a) creating a document file in rich text format (RTF) with layout code generating an original document layout;
(b) compiling a target list of word processor applications into each of which the document file is to be retrieved in a corresponding target document layout, the target document layout for each word processor application on the list desired to be substantially identical to the original document layout; and
(c) organizing the word processor applications on the list into a priority of descending order of commercial popularity;
(d) making selected customizations to the layout code in the document file, each of said customizations making the target document layout for at least one word processor application on the list more closely identical to the original document layout, the customizations selected in order of said priority, said step (d) including the substeps of:
(i) retrieving the document file into a selected word processor application on the list;
(ii) identifying differences between the target document layout for the selected word processor application and the original document layout; and
(iii) adapting the layout code to remove at least one of the differences identified in substep (d)(ii);.

the customizations selected from the group consisting of:
(1) setting paper size to default for the native country;
(2) setting margins all round as narrow as is allowed by printable area;
(3) inserting a leading empty plain flowing text paragraph;
(4) inserting a leading empty frame;
(5) sequencing document frames in logical reading order;
(6) surrounding frame commands with double braces;
(7) expressing pich and picw values in the same coordinate space units as specified in the metafile to which said pich and picw values refer;
(8) maintaining \posx, \posy, \absw and \absh frame code commands in sequence;
(9) initializing \absw and \absh values in frame code to zero;
(10) enabling frame expansion with a \pard\plain\f0 command sequence; and
(11) when a picture size is less than 10 points, enabling frame shrinking with a \fs command.

9. The method of claim 8, in which at least one word processor application on the list is selected from the group consisting of:
(1) Microsoft Word;
(2) Corel WordPerfect;
(3) Lotus WordPro;
(4) Aldus Pagemaker;
(5) Microsoft Works; and
(6) Microsoft WordPad.

10. A method of tuning layout code in a universally readable document file, comprising:
(a) creating a document file in a universal format with layout code generating an original document layout;
(b) compiling a target list of word processor applications into each of which the document file is to be retrieved in a corresponding target document layout, at least one word processor application on the list selected from the group consisting of:
(1) Microsoft Word;
(2) Corel WordPerfect;
(3) Lotus WordPro;
(4) Aldus Pagemaker;
(5) Microsoft Works; and
(6) Microsoft WordPad;
the target document layout for each word processor application on the list desired to be substantially identical to the original document layout; and
(c) making selected customizations to the layout code in the document file, each of said customizations making the target document layout for at least one word processor application on the list more closely identical to the original document layout.

11. The method of claim 10, in which step (c) includes the substeps of:

(i) retrieving the document file into a selected word processor application on the list;

(ii) identifying differences between the target document layout for the selected word processor application and the original document layout; and (iii) adapting the layout code to remove at least one of the differences identified in substep (ii).

12. The method of claim 10, in which the universal format is Rich Text Format (RTF).

13. The method of claim 10, in which at least one of the customizations made in step (c) is selected from the group consisting of:

(1) setting paper size to default for the native country so as to make the target document layout for at least Corel WordPerfect more closely identical to the original document layout;

(2) setting margins all round as narrow as is allowed by printable area;

(3) inserting a leading empty plain flowing text paragraph so as to make the target document layout for at least Microsoft Word more closely identical to the original document layout;

(4) inserting a leading empty frame so as to make the target document layout for at least Corel WordPerfect more closely identical to the original document layout; and (5) sequencing document frames in logical reading order.

14. The method of claim 10, in which the universal format is Rich Text Format (RTF), and in which at least one of the customizations made in step (c) is selected from the group consisting of:

(1) surrounding frame commands with double braces so as to make the target document layout for at least Microsoft WordPad more closely identical to the original document layout;

(2) expressing pich and picw values in the same coordinate space units as specified in the metafile to which said pich and picw values refer, so as to make the target document layout for at least Microsoft Word more closely identical to the original document layout;

(3) maintaining \posx, \posy, \absw and \absh frame code commands in sequence so as to make the target document layout for at least Lotus WordPro more closely identical to the original document layout;

(4) initializing \absw and \absh values in frame code to zero;

(5) enabling frame expansion with a \pard\plain\f0 command sequence; and (6) when a picture size is less than 10 points, enabling frame shrinking with a \fs command.

* * * * *